US006606349B1

(12) United States Patent
Kudhrethaya et al.

(10) Patent No.: US 6,606,349 B1
(45) Date of Patent: Aug. 12, 2003

(54) SPREAD SPECTRUM RECEIVER PERFORMANCE IMPROVEMENT

(75) Inventors: Shridhara A. Kudhrethaya, Irvine, CA (US); Paul A. Underbrink, Lake Forest, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 09/244,696

(22) Filed: Feb. 4, 1999

(51) Int. Cl.$^7$ .................................................. H04B 1/69

(52) U.S. Cl. ......................... 375/150; 375/142; 375/343

(58) Field of Search ................................. 375/150, 130, 375/140, 141, 142, 143, 145, 147, 149, 152, 343; 370/203, 208, 209, 320, 335, 342, 441, 479; 701/200, 213

(56) References Cited

U.S. PATENT DOCUMENTS

| | | | |
|---|---|---|---|
| 3,604,911 A | 9/1971 | Schmitt | 235/181 |
| 3,975,628 A | 8/1976 | Graves et al. | 250/199 |
| 4,241,312 A * | 12/1980 | Barnes et al. | 375/254 |
| 4,426,712 A | 1/1984 | Gorski-Popiel | 375/96 |
| 4,445,118 A | 4/1984 | Taylor et al. | 343/357 |
| 4,463,357 A | 7/1984 | MacDoran | 343/460 |
| 4,578,678 A | 3/1986 | Hurd | 343/357 |
| 4,667,203 A | 5/1987 | Counselman, III | 342/357 |
| 4,701,934 A | 10/1987 | Jasper | 375/1 |
| 4,754,465 A | 6/1988 | Trimble | 375/1 |
| 4,785,463 A | 11/1988 | Janc et al. | 375/1 |
| 4,809,005 A | 2/1989 | Counselman, III | 342/352 |
| 4,821,294 A | 4/1989 | Thomas, Jr. | 375/96 |
| 4,890,233 A | 12/1989 | Ando et al. | 364/457 |

(List continued on next page.)

FOREIGN PATENT DOCUMENTS

| | | |
|---|---|---|
| JP | 0639901 A2 | 2/1995 |
| JP | 0639901 A3 | 2/1995 |
| JP | 08/065205 A | 3/1996 |
| WO | WO 92/13392 | 8/1992 |
| WO | WO 00/19644 | 4/2000 |

OTHER PUBLICATIONS

Gupta, S.; Nath, P.K.; Sarkar, B.K. "Integrated Microstrip Shorted Antenna Using Hybrid Active Circulator" Microwave Conference, 2000 Asia–Pacific, 2000 pp 719–722.*
Isard, Phil "Active Antennas"HJ4F, Feb., 1998 pp 6–8 n9tu.home.icq.com/HJ4f.htm.*
D. J. R. Van Nee and A. J. R. M. Coenen, "New Fast GPS Code–Acquistion Technique Using FFT," Jan. 17, 1991, *Electronics Letters*, vol. 27, No. 2.

*Primary Examiner*—Stephen Chin
*Assistant Examiner*—Chieh M. Fan
(74) *Attorney, Agent, or Firm*—The Eclipse Group; Gregory B. Gulliver; Francisco A. Rubio-Campos

(57) ABSTRACT

Embodiments of the invention are used to improve performance of spread spectrum communications equipment. The improvement may take the form of improved sensitivity to weak signals, quicker acquisition time of weak signals, or the reduction of multipath interference. To acquire a spread spectrum signal PN codes are commonly compared with the spread spectrum signal. This comparison is often in reality a successive series of comparisons with the same code. Successive comparisons are often carried out in a process called hypothesis testing by which the correlated output of the spread spectrum signal and the PN code must pass a series of thresholds. This method is adopted to prevent identifying a PN code as being present based on a spurious correlation value. This method of successive comparisons also prevents a low correlated value from being rejected immediately thereby helping assure that signals with low signal strength can be identified also. By adjusting the series of comparison levels within the hypothesis tester depending on the signal strength weak signals can be identified quicker and easier, multipath signals can be rejected better, and amplification devises such as active antennas can be switched on and off.

16 Claims, 9 Drawing Sheets

U.S. PATENT DOCUMENTS

| | | | |
|---|---|---|---|
| 4,894,662 A | 1/1990 | Counselman | 342/357 |
| 4,894,842 A | 1/1990 | Broekhoven et al. | 375/1 |
| 4,992,720 A | 2/1991 | Hata | 320/23 |
| 4,998,111 A | 3/1991 | Ma et al. | 342/352 |
| 5,014,066 A | 5/1991 | Counselman, III | 342/352 |
| 5,018,088 A | 5/1991 | Higbie | 364/574 |
| 5,036,329 A | 7/1991 | Ando | 342/357 |
| 5,043,736 A | 8/1991 | Darnell et al. | 342/357 |
| 5,108,334 A | 4/1992 | Eschenbach et al. | 455/314 |
| 5,148,042 A | 9/1992 | Nakazoe | 307/65 |
| 5,153,591 A | 10/1992 | Clark | 341/51 |
| 5,179,724 A | 1/1993 | Lindoff | 455/76 |
| 5,202,829 A | 4/1993 | Geier | 364/449 |
| 5,225,842 A | 7/1993 | Brown et al. | 342/357 |
| 5,253,268 A | 10/1993 | Omura et al. | 375/1 |
| 5,276,765 A | 1/1994 | Fremman et al. | 395/2 |
| 5,293,170 A | 3/1994 | Lorenz et al. | 376/309 |
| 5,293,398 A | 3/1994 | Hamao et al. | 375/1 |
| 5,297,097 A | 3/1994 | Etoh et al. | 365/226 |
| 5,311,195 A | 5/1994 | Mathis et al. | 342/357 |
| 5,323,164 A | 6/1994 | Endo | 342/357 |
| 5,343,209 A | 8/1994 | Sennott et al. | 342/357 |
| 5,345,244 A | 9/1994 | Gildea et al. | 342/357 |
| 5,347,536 A | 9/1994 | Meehan | 375/1 |
| 5,352,970 A | 10/1994 | Armstrong, II | 320/39 |
| 5,363,030 A | 11/1994 | Ford et al. | 320/13 |
| 5,378,155 A | 1/1995 | Eldridge | 434/11 |
| 5,379,224 A | 1/1995 | Brown et al. | 364/449 |
| 5,396,515 A * | 3/1995 | Dixon et al. | 375/208 |
| 5,402,346 A | 3/1995 | Lion et al. | 364/436 |
| 5,402,347 A | 3/1995 | McBurney et al. | 364/443 |
| 5,410,747 A | 4/1995 | Ohmagari et al. | 455/118 |
| 5,416,712 A | 5/1995 | Geier et al. | 364/450 |
| 5,418,818 A | 5/1995 | Marchetto et al. | 375/264 |
| 5,420,593 A | 5/1995 | Niles | 342/357 |
| 5,440,313 A | 8/1995 | Osterdock et al. | 342/352 |
| 5,450,344 A | 9/1995 | Woo et al. | 364/449 |
| 5,498,239 A | 3/1996 | Galel et al. | 604/95 |
| 5,504,684 A | 4/1996 | Lau et al. | 364/443 |
| 5,546,445 A | 8/1996 | Dennison et al. | 379/60 |
| 5,548,613 A | 8/1996 | Kahu et al. | 375/208 |
| 5,550,811 A | 8/1996 | Kahu et al. | 370/18 |
| 5,568,473 A * | 10/1996 | Hemmati | 370/342 |
| 5,577,022 A * | 11/1996 | Padovani et al. | 370/332 |
| 5,577,023 A | 11/1996 | Marum et al. | 370/16 |
| 5,577,025 A * | 11/1996 | Skinner et al. | 370/209 |
| 5,592,173 A | 1/1997 | Lau et al. | 342/357 |
| 5,594,453 A | 1/1997 | Rodal et al. | 342/357 |
| 5,608,722 A | 3/1997 | Miller | 370/320 |
| 5,623,485 A | 4/1997 | Bi | 370/209 |
| 5,625,668 A | 4/1997 | Loomis et al. | 379/58 |
| 5,640,429 A | 6/1997 | Michaels et al. | 375/340 |
| 5,640,431 A | 6/1997 | Bruckert et al. | 375/344 |
| 5,642,377 A * | 6/1997 | Chung et al. | 375/200 |
| 5,644,591 A | 7/1997 | Sutton | 375/200 |
| 5,649,000 A | 7/1997 | Lee et al. | 455/436 |
| 5,650,792 A | 7/1997 | Moore et al. | 343/725 |
| 5,654,718 A | 8/1997 | Beason et al. | 342/357 |
| 5,663,734 A | 9/1997 | Krasner | 342/357 |
| 5,663,735 A | 9/1997 | Eshenbach | 342/357 |
| 5,689,814 A | 11/1997 | Hagisawa et al. | 455/69 |
| 5,722,061 A * | 2/1998 | Hutchinson, IV et al. | 455/245.1 |
| 5,734,674 A | 3/1998 | Fenton et al. | 375/207 |
| 5,734,966 A | 3/1998 | Farrer et al. | 455/63 |
| 5,737,329 A | 4/1998 | Horiguchi | 370/342 |
| 5,739,596 A | 4/1998 | Takizawa et al. | 307/66 |
| 5,749,067 A | 5/1998 | Barrett | 704/233 |
| 5,781,156 A | 7/1998 | Krasner | 342/357 |
| 5,784,695 A | 7/1998 | Upton et al. | 455/442 |
| 5,786,789 A | 7/1998 | Janky | 342/357 |
| 5,812,087 A | 9/1998 | Krasner | 342/357 |
| 5,825,327 A | 10/1998 | Krasner | 342/357 |
| 5,828,694 A | 10/1998 | Schipper | 375/208 |
| 5,831,574 A | 11/1998 | Krasner | 342/357 |
| 5,832,021 A | 11/1998 | Kondo | 375/200 |
| 5,841,396 A | 11/1998 | Krasner | 342/357 |
| 5,845,203 A | 12/1998 | LaDue | 455/414 |
| 5,854,605 A | 12/1998 | Gildea | 342/357 |
| 5,862,465 A * | 1/1999 | Ou | 455/234.1 |
| 5,867,535 A | 2/1999 | Phillips et al. | 375/295 |
| 5,867,795 A | 2/1999 | Novis et al. | 455/566 |
| 5,872,540 A | 2/1999 | Casabona et al. | 342/362 |
| 5,874,914 A | 2/1999 | Krasner | 342/357 |
| 5,877,724 A | 3/1999 | Davis | 342/357 |
| 5,877,725 A | 3/1999 | Kalafus | 342/357 |
| 5,881,371 A | 3/1999 | Reynolds | 455/83 |
| 5,883,594 A | 3/1999 | Lau | 342/357 |
| 5,884,214 A | 3/1999 | Krasner | 701/207 |
| 5,889,474 A | 3/1999 | LaDue | 340/825.49 |
| 5,903,654 A | 5/1999 | Milton et al. | 380/49 |
| 5,907,809 A | 5/1999 | Molnar et al. | 455/456 |
| 5,909,640 A | 6/1999 | Farrer et al. | 455/63 |
| 5,917,444 A | 6/1999 | Loomis et al. | 342/357 |
| 5,917,829 A | 6/1999 | Hertz et al. | 370/479 |
| 5,920,283 A | 7/1999 | Shaheen et al. | 342/357 |
| 5,923,703 A | 7/1999 | Pon et al. | 375/209 |
| 5,924,024 A | 7/1999 | Ikeda et al. | 455/313 |
| 5,926,131 A | 7/1999 | Sakumoto et al. | 342/357 |
| 5,936,572 A | 8/1999 | Loomis et al. | 342/357 |
| 5,943,363 A | 8/1999 | Hanson et al. | 375/206 |
| 5,945,944 A | 8/1999 | Krasner | 342/357.06 |
| 5,956,328 A | 9/1999 | Sato | 370/335 |
| 5,963,582 A | 10/1999 | Stansell, Jr. | 375/200 |
| 5,970,084 A | 10/1999 | Honda | 375/200 |
| 5,977,909 A | 11/1999 | Harrison et al. | 342/357.09 |
| 5,982,324 A | 11/1999 | Watters et al. | 342/357.06 |
| 5,987,016 A | 11/1999 | He | 370/335 |
| 5,991,309 A | 11/1999 | Jensen et al. | 370/492 |
| 5,991,613 A * | 11/1999 | Euscher et al. | 455/277.1 |
| 5,995,537 A | 11/1999 | Kondo | 375/208 |
| 5,999,124 A | 12/1999 | Sheynblat | 342/357.09 |
| 6,002,362 A | 12/1999 | Gudat | 342/357.03 |
| 6,002,363 A | 12/1999 | Krasner | 342/357.1 |
| 6,002,709 A * | 12/1999 | Hendrickson | 375/206 |
| 6,009,551 A | 12/1999 | Sheynblat | 714/776 |
| 6,016,119 A | 1/2000 | Krasner | 342/357.06 |
| 6,023,462 A * | 2/2000 | Nieczyporowicz et al. | 370/335 |
| 6,041,222 A | 3/2000 | Horton et al. | 455/255 |
| 6,047,016 A | 4/2000 | Ramberg et al. | 375/200 |
| 6,047,017 A | 4/2000 | Cahn et al. | 375/200 |
| 6,049,715 A * | 4/2000 | Willhoff et al. | 455/436 |
| 6,052,081 A | 4/2000 | Krasner | 342/357.02 |
| 6,061,018 A | 5/2000 | Sheynblat | 342/357.06 |
| 6,064,336 A | 5/2000 | Krasner | 342/357.05 |
| 6,064,688 A | 5/2000 | Yanagi | 375/149 |
| 6,075,809 A * | 6/2000 | Naruse | 375/147 |
| 6,104,338 A | 8/2000 | Krasner | 342/357.06 |
| 6,104,340 A | 8/2000 | Krasner | 342/357.1 |
| 6,107,960 A | 8/2000 | Krasner | 342/357.09 |
| 6,111,540 A | 8/2000 | Krasner | 342/357.1 |
| 6,131,067 A | 10/2000 | Girerd et al. | 701/213 |
| 6,133,871 A | 10/2000 | Krasner | 342/357.06 |
| 6,133,873 A | 10/2000 | Krasner | 342/357.12 |
| 6,133,874 A | 10/2000 | Krasner | 342/357.15 |
| 6,150,980 A | 11/2000 | Krasner | 342/357.1 |

* cited by examiner

|  | 407 Code for data "1" | 409 Code for data "0" |
|---|---|---|
| Spreading Code #1 | 11000011 | 00111100 |
| Spreading Code #2 | 00110011 | 11001100 |
| Spreading Code #3 | 10010110 | 01101001 |

411 — Data "1" transmitted (code #1)

| Data "1" transmitted (code #1) | 1 | 1 | -1 | -1 | -1 | -1 | 1 | 1 |
|---|---|---|---|---|---|---|---|---|
| Multiply by spreading code #1 | 1 | 1 | -1 | -1 | -1 | -1 | 1 | 1 |
| Product of each bit / Total | 1+ | 1+ | 1+ | 1+ | 1+ | 1+ | 1+ | 1 = +8 |

413 / 415

| Data "1" transmitted (code #1) | -1 | -1 | 1 | 1 | 1 | 1 | -1 | -1 |
|---|---|---|---|---|---|---|---|---|
| Multiply by spreading code #1 | 1 | 1 | -1 | -1 | -1 | -1 | 1 | 1 |
| Product of each bit / Total | -1 | -1 | -1 | -1 | -1 | -1 | -1 | -1 = -8 |

417 / 419 / 421

| Data "1" transmitted (code #1) | 1 | 1 | -1 | -1 | -1 | -1 | 1 | 1 |
|---|---|---|---|---|---|---|---|---|
| Multiply by spreading code #1 | -1 | -1 | 1 | 1 | -1 | -1 | 1 | 1 |
| Product of each bit / Total | -1 | -1 | -1 | -1 | +1 | +1 | +1 | +1 = 0 |

423 / 425 / 427

| Data "1" transmitted (code #1) | 1 | 1 | -1 | -1 | -1 | -1 | 1 | 1 |
|---|---|---|---|---|---|---|---|---|
| Multiply by spreading code #1 | 1 | -1 | -1 | 1 | -1 | 1 | 1 | -1 |
| Product of each bit / Total | +1 | -1 | +1 | -1 | +1 | -1 | +1 | -1 = 0 |

SPREAD SPECTRUM RECEIVER PERFORMANCE IMPROVEMENT

FIELD OF THE INVENTION

The present invention relates generally to spread spectrum communications systems, processes and systems that use spread spectrum communication, and, in particular embodiments to such systems, processes and devices which improve the performance of spread spectrum communications systems in the presence of adverse signal conditions.

DESCRIPTION OF THE RELATED ART

It is likely that the first navigational system used by man was the sun. It rose in the east and set in the west and as long as travel occurred in daylight hours general direction could be obtained from the sun's position in the sky. With the advent of commerce on the seas it became necessary to ascertain direction at night, and so stellar navigation was born. In order to increase accuracy, stellar and solar navigation techniques were improved and augmented through the use of maps, charts, and instruments such as the astrolabe and compass. Even augmented by such instruments, stellar and solar navigation was error prone and traveling from point A to point B was still, to some extent, a matter of trial and error.

With the advent of radio, and particularly powerful commercial radio stations land based radio direction finding (RDF) came into being. The principle behind RDF is relatively simple. A navigator can tune to a radio station using a directional antenna to find the directional bearing of the radio station. The navigator can then could tune to a second radio station and find the bearing of that station. By knowing the bearing and map location of both stations the navigator's position can be calculated.

Continuing advances in long distance air travel necessitated the ability to guide aircraft accurately. RDF was used to satisfy this requirement and land based beacons were established for the purpose of navigation. These beacons quickly became indispensable to all aviation and to ships as well.

The Global Positioning System (GPS) is also based on radio navigation, a difference being that the beacons are no longer stationary and are no longer land based. The GPS system is a satellite based navigation system having a network of 24 satellites, plus on orbit spares, orbiting the earth 11,000 nautical miles in space, in six evenly distributed orbits. Each satellite orbits the earth every twelve hours.

A prime function of the GPS satellites is to serve as a clock. Each satellite derives its signals from an on board 10.23 MHz Cesium atomic clock. Each satellite transmits a spread spectrum signal with it's own individual pseudo noise (PN) code. By transmitting several signals over the same spectrum using distinctly different PN coding sequences the satellites may share the same bandwidth without interfering with each other. The code used in the GPS system is 1023 bits long and is sent at a rate of 1.023 megabits per second, yielding a time mark, sometimes called a "chip" approximately once every micro-second. The sequence repeats once every millisecond and is called the course acquisition code (C/A code). Every 20th cycle the code can change phase and is used to encode a 1500 bit long message which contains an "almanac" containing data on all the other satellites.

There are 32 PN codes designated by the GPS authority. Twenty four of them belong to current satellites in orbit, the 25th PN code is designated as assigned to any satellite. The remaining codes are spare codes which may be used in new satellites to replace old or failing units. A GPS receiver may, using the different PN sequences, search the signal spectrum looking for a match. If the GPS receiver finds a match, then it has identified the satellite which has generated the signal.

Ground based GPS receivers may use a variant of radio direction finding (RDF) methodology, called triangulation, in order to determine the position of the ground based GPS receiver. The GPS position determination is different from the RDF technology in that the radio beacons are no longer stationary they are satellites moving through space at a speed of about 1.8 miles per second as they orbit the earth. By being space based, the GPS system can be used to establish the position of virtually any point on Earth using methods such as triangulation.

The triangulation method depends on the GPS receiving unit obtaining a time signal from a satellite. By knowing the actual time and comparing it to the time that is received from the satellite the receiver, the distance to the satellite can be calculated. If, for example, the GPS satellite is 12,000 miles from the receiver then the receiver must be somewhere on the location sphere defined by the radius of 12,000 from that satellite. If the GPS receiver then ascertains the position of a second satellite it can calculate the receiver's location based on a location sphere around the second satellite. The two sphere's intersect and form a circle, and so the GPS receiver must be located somewhere within that location circle. By ascertaining the distance to a third satellite the GPS receiver can project a location sphere around the third satellite. The third satellite's location sphere will then intersect the location circle produced by the intersection of the location spheres of the first two satellites at just two points. By determining the location sphere of one more satellite, whose location sphere will intersect one of the two possible location points, the precise position of the GPS receiver is determined. As a consequence, the exact time may also be determined, because there is only one time offset that can account for the positions of all the satellites. The triangulation method may yield positional accuracy on the order of 30 meters, however the accuracy of GPS position determination may be degraded due to signal strength and multipath reflections.

As many as 11 satellites may be received by a GPS receiver at one time. In certain environments such as a canyon, some satellites may be blocked out, and the GPS position determining system may depend for position information on satellites that have weaker signal strengths, such as satellites near the horizon. In other cases overhead foliage may reduce the signal strength that is received by the GPS receiver unit. In either case the signal strength may be so reduced as to make acquisition of enough satellites to determine position difficult. In such cases the GPS receiver may take a number of attempts to lock onto the satellites and increased time to lock onto signals suitable for position determination, or it may not be able to lock on to the signals at all.

In the case of multipath reflections, a signal may be reflected from a structure, or even the ground, so that the signal's path to the receiver is indirect. An indirect path is longer than a direct path and will make the time the signal has to travel to the receiver longer and the distance to the satellite will appear to be farther away as a result. The resulting position calculated by the receiver may contain an error.

There are multiple ways of using radio spectrum to communicate. For example, in frequency division multiple access (FDMA) the frequency band is divided into a series of frequency slots and different transmitters are allotted different frequency slots.

n time division multiple access (TDMA) systems in which the time that each transmitter may broadcast is limited to a time slot, such that transmitters transmit their messages one after another, only transmitting during their allotted period. With TDMA, the frequency upon which each transmitter transmits may be a constant frequency or may be continuously changing (frequency hopping).

A third way of allotting the radio spectrum to multiple users is through the use of code division multiple access (CDMA) also known as spread spectrum. In CDMA all the users transmit on the same frequency band all of the time. Each user has a dedicated code that is used to separate that user's transmission from all others. This code is commonly referred to as a spreading code, because it spreads the information across the band. The code is also commonly referred to as a Pseudo Noise or PN code. In a CDMA transmission, each bit of transmitted data is replaced by that particular user's spreading code if the data to be transmitted is a "1", and is replaced by the inverse of the spreading, code if the data to be transmitted is "0".

To decode the transmission at the receiver it is necessary to "despread" the code. The despreading process takes the incoming signal and multiplies it by the spreading code and sums the result. This process is commonly known as correlation, and it is commonly said that the signal is correlated with the PN code. The result of the despreading process is that the original data may be separated from all the other transmissions, and the original signal may be recovered. A property of the PN codes that are used in CDMA systems is that the presence of one spread spectrum code does not change the result of the decoding of another code. The property that one code does not interfere with the presence of another code is often referred to as orthogonality, and codes which possess this property are said to be orthogonal.

Although the term CDMA is used widely to describe a type of telephone communications the term spread spectrum may also be applied. Those terms will be used interchangeably herein.

The process of extracting data from a CDMA signal is commonly known by many terms such as correlating, decoding, and despreading. Those terms will be used interchangeably herein.

The codes used by a spread spectrum system are commonly referred to by a variety of terms including, but not limited to, PN (Pseudo Noise) codes, PR (Pseudo Random) codes, spreading code, despreading code, and orthogonal code Those terms will be used interchangeably herein.

It is because the transmission bandwidth is large compared with the data bandwidth that CDMA is often referred to as spread spectrum. Spread spectrum has a number of benefits. One benefit being that because the data transmitted is spread across the spectrum, spread spectrum can tolerate interference better than some other transmission protocol. Another benefit is that messages can be transmitted with low power and still be decoded.

The Global Positioning System uses spread spectrum technology to convey its data to ground units. The use of spread spectrum is especially advantageous in the GPS systems. Spread spectrum technology enables GPS receivers to operate on a single frequency, thus saving the additional electronics needed to switch and tune other bands if multiple frequencies were used. Spread Spectrum also can minimize the power consumption requirements of the GPS system, for example to require 50 watts or less and tolerate substantial interference.

Although the GPS system is available widely, there are conditions which can degrade its performance or block its use. Improvements in the reception of GPS signals are constantly being sought. There is a need for greater sensitivity in receiving GPS signals to improve the performance of ground based receivers.

CDMA (Code Division Multiple Access) is used as an alternative to FDMA (Frequency Division Multiple Access) and TDMA (Time Division Multiple Access) in portable phone systems. There has been widespread debate over the superiority of TDMA versus CDMA. Both technologies continually vie for market acceptance and market share, and because of this competition improvements in each are constantly being sought. There is therefore a need in the art for improvement of the sensitivity of CDMA portable phone systems.

SUMMARY OF THE DISCLOSURE

Accordingly, preferred embodiments of the present invention are directed to systems which incorporate spread spectrum technology. GPS receivers, cordless and portable telephones are examples of systems which may employ spread spectrum technology, and are used herein to illustrate preferred embodiments of the invention.

Spread spectrum technology can be advantageous in applications where signals need to be transmitted with low power. This is'so because the spreading process introduces redundancy into the signal being transmitted by replacing each data bit by a series of bits commonly called Pseudo Noise, or PN codes. This redundancy enables the signal to be decoded even though parts of it may be obscured by noise.

To receive the data a spread spectrum receiver must determine that the PN code is present. To determine that a PN code is present in a received signal, the received signal must be compared, bit by bit, to the PN code. This process of comparing a signal bit by bit to a PN code is commonly known as correlation. A perfect match will indicate the presence of the signal. Less than a perfect match, however, may also indicate the presence of the signal. This is so because noise may disturb the bit pattern of the signal broadcast, with the result that not all bits of the signal match the code. One of the advantages of spread spectrum is that the signal is redundant so that, even if a number of bits are destroyed by noise, the remaining bits may be detected and the signal decoded.

To determine that a particular spread spectrum is present, the received signal must be compared, bit by bit, to the PN code, and the results of the comparison examined. If the result is a 100% match between the PN code and the signal received a signal containing the code is probably present. If, however, there is less than a 100% match the signal may still be present. To examine for the presence of the signal a process commonly known as hypothesis testing is employed. Hypothesis testing examines a signal for a certain percentage match. If that percentage match, between the signal and the PN code, is met or exceeded, the hypothesis testing proceeds to test for a greater percentage threshold. The process of testing for increasingly higher percentage match thresholds, between the signal and the PN code, terminates when a final threshold is passed and it is determined that the signal is present. The hypothesis testing process may also terminate if successive attempts are not successful in passing the percentage matching thresholds. If a certain number of successive attempts fail to pass the successive thresholds, of the hypothesis tester, it is determined that the signal, containing the PN code, is not present. The hypotheses testing process can insure with a high probability that a signal is present, even if a 100% match is never obtained. The hypotheses testing process helps to eliminate false positive matches, and also helps to prevent false negatives (erroneous indications that the particular PN code is not present).

The hypothesis testing process has a weakness in that it may take a long time and multiple attempts to determine that a weak signal is present. Multiple attempts at matching the PN code to the signal may be necessary because, in case of weak signal conditions, random noise can easily interfere with the signal, destroying the bit pattern. The process of hypothesis testing depends on multiple samplings of the signal, thereby, on average, negating the effect of random noise. The hypothesis testing process also has a weakness in that reflected, or multipath, signals may be strong enough to cause a false indication.

Embodiments of the disclosure provide several improvements upon the process of hypothesis testing and of spread spectrum signal processing in general. One preferred embodiment measures the signal strength of the incoming spread spectrum signal and adjusts the hypotheses testing levels depending on the level of received signal strength. Decreasing the threshold levels, in the case where a spread spectrum signal is weak, will decrease the time that will be needed to identify that a signal bearing a certain PN code is present. Increasing the threshold levels, when the signal is strong, will help prevent multipath signals from being falsely identified as being the broadcast signal, bearing the PN code, sought.

In addition, various embodiments utilize both old and novel methods of determining signal strength. New methods, employed in several embodiments of the disclosure, use a PN code not present in the spread spectrum signal being decoded, to determine the signal strength. The code, which is not present in the spread spectrum signal received, is correlated with the spread spectrum signal. The result of the correlation with the unused code is indicative of the signal strength. In a GPS embodiment of the disclosure the 25th GPS code is correlated with the incoming signal. The 25th GPS code is one which has been identified by the GPS authority as not being present in any GPS satellite. Correlation of the GPS signal with this code yields a result that is indicative of the strength of the spread spectrum signal.

BRIEF DESCRIPTION OF THE DRAWINGS

FIG. 4 is, a tabular representation of the spreading and despreading process illustrated with a spreading code of length 8.

DETAILED DESCRIPTION OF PREFERRED EMBODIMENTS

A first example embodiment described herein relates to GPS receiver system, process and device.

Figure 1:
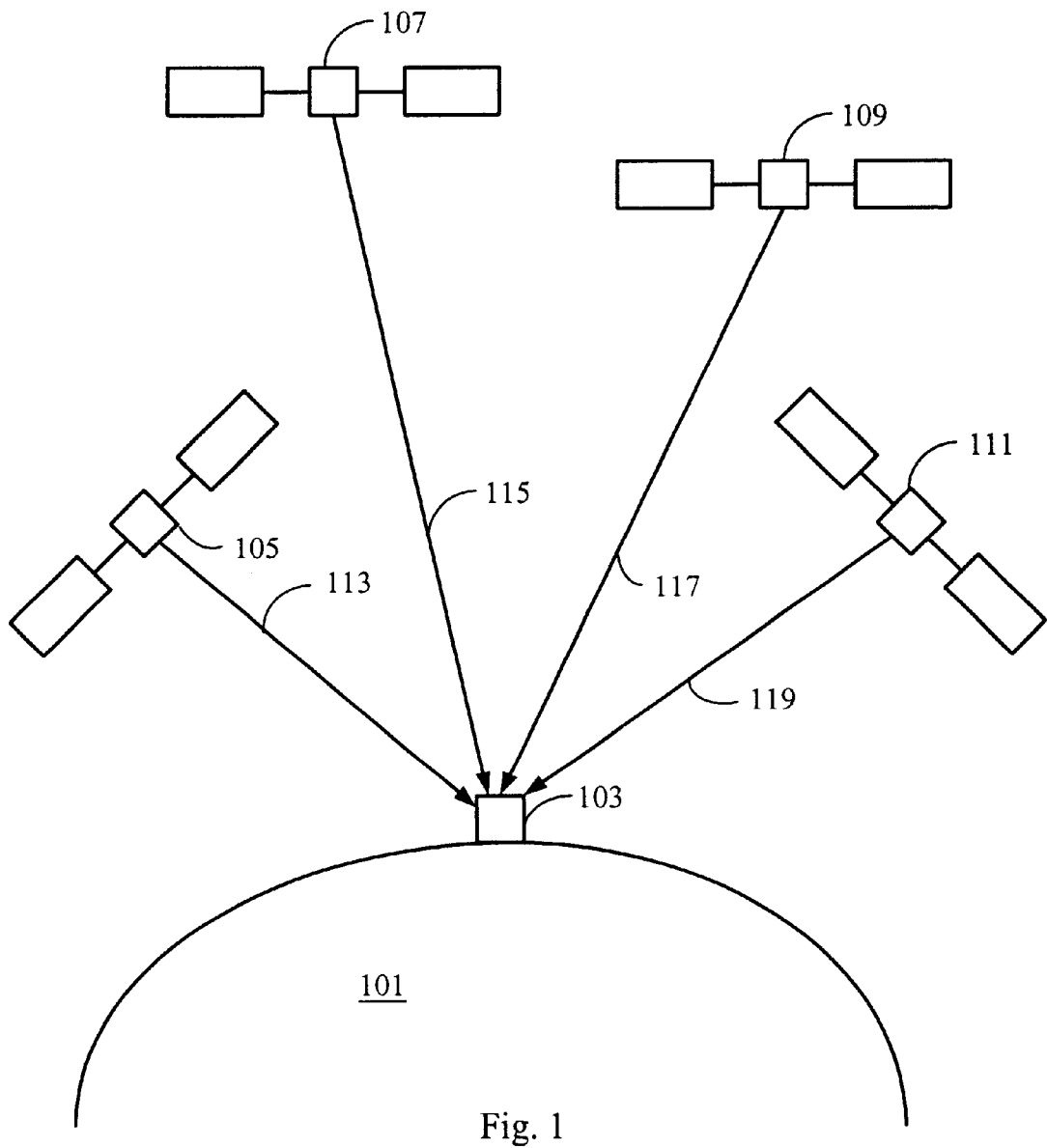
FIG. 1 is an illustration of a GPS receiver concurrently receiving signals from four GPS satellites.

FIG. 1 is an illustration of a GPS receiver 103 on earth 101 concurrently receiving signals from four GPS satellites 105, 107, 109, and 111 in space. The four GPS satellites 105, 107, 109 and 111 continually broadcast a high accuracy time signal which is received by GPS receiver 103. The signal from each of the GPS satellites 105, 107, 109, and 111 must respectively travel different paths 113, 115, 117 and 119. The time signal from each satellite is received includes the time that the time necessary for signals from the satellites need to travel the different paths to the receiver. The satellites also broadcast data about their position as well as a time signal. By knowing the positions of the satellites and using the time signals to compute the distance of the receiver from the satellites the receiver can accurately determine it's position.

Figure 2:
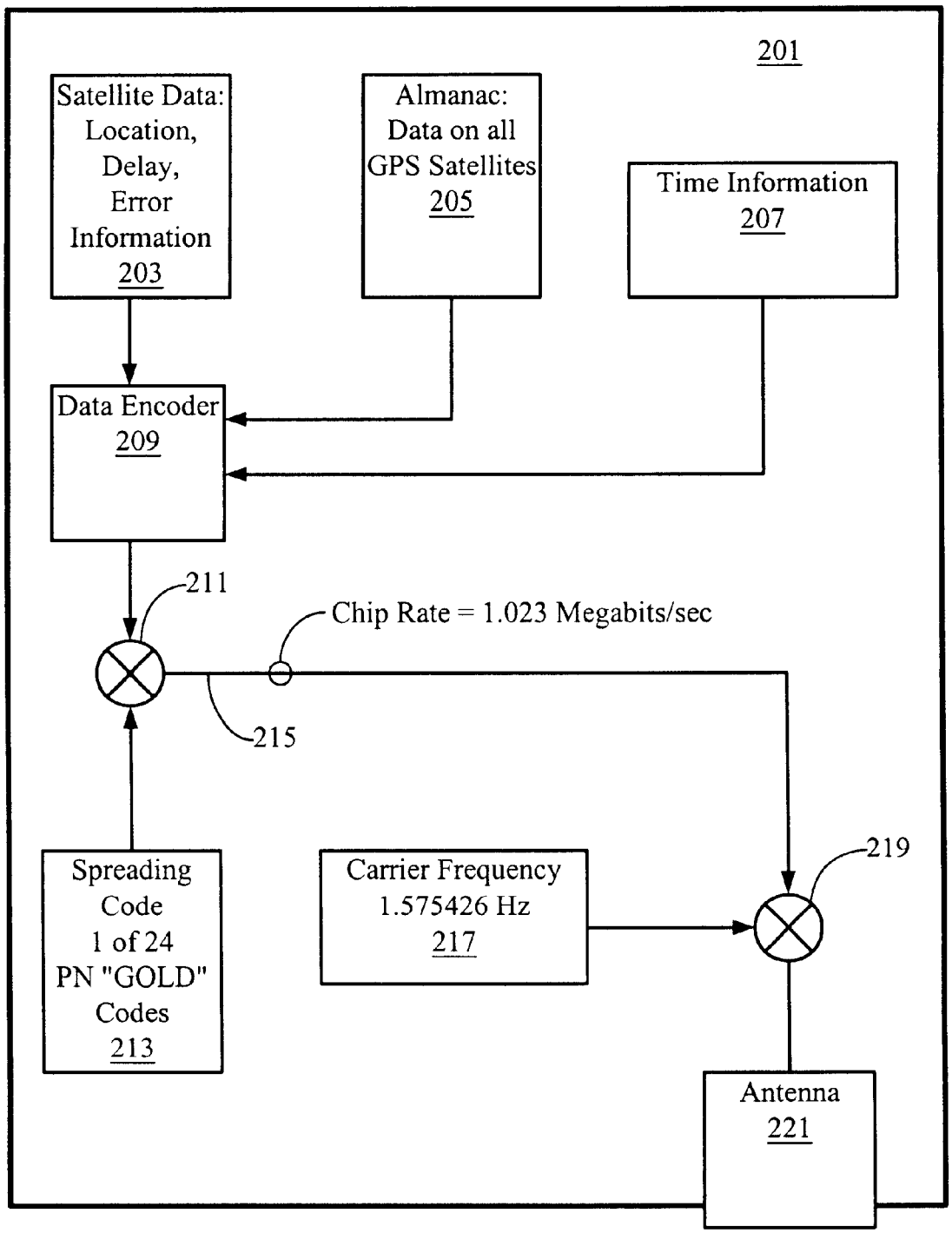
FIG. 2 a block diagram representation of a portion of a GPS satellite.

FIG. 2 is a block diagram of a portion 201 of a GPS satellite for spread spectrum encoding and the transmission of data. Block 203 represents satellite data that will be encoded for transmission. This data includes location information for the satellite, as well as delay and error information. Block 205 represents what is commonly referred to as almanac data, which is data on all of the GPS satellites. Block 207 represents the current time which is generated by the high accuracy atomic time standard within the satellite. The information from blocks 203, 205, and 207 are encoded in the proper format by the data encoder 209. The encoded data is then sent to the spreading unit 211, which correlates the encoded data by multiplying it bit by bit with one of 24 spreading codes as provided by storage device 213. Each of the 24 spreading codes represents a particular satellite on orbit. The chip rate is equal to the data rate multiplied time the length of the spreading code. The data stream is then sent to the modulator 219 where the carrier frequency 1.57542 GHz as provided by generator 217 is modulated by it. The resulting signal is sent to the antenna 221 of the satellite for broadcast.

Figure 3:
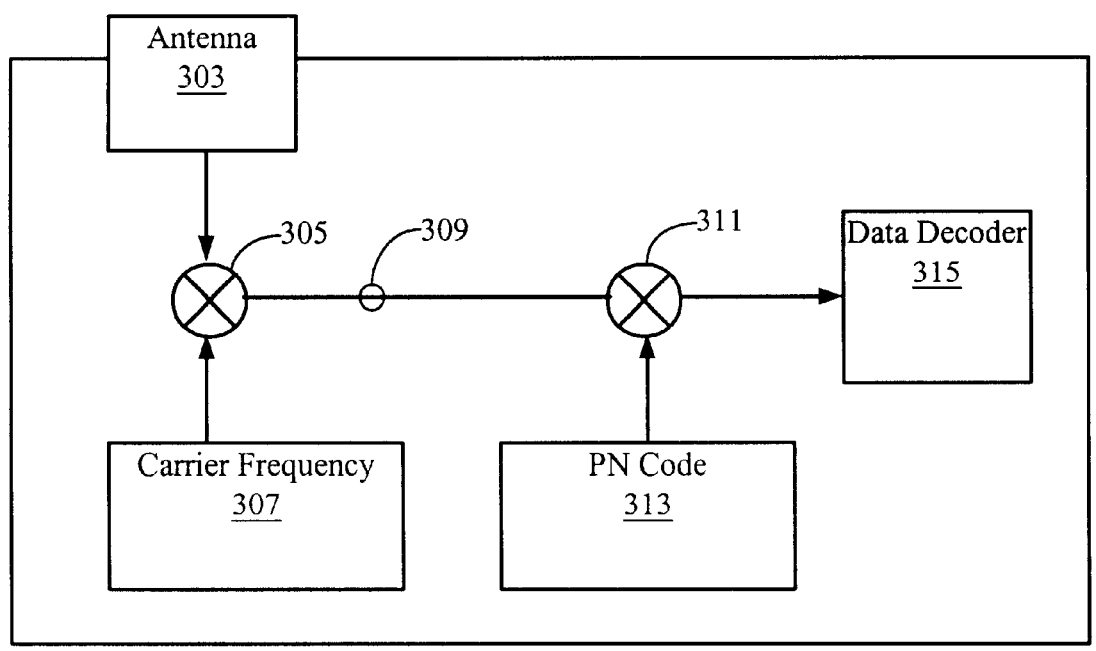
FIG. 3 is a generalized block diagram representation of a portion of an example GPS receiver.

FIG. 3 is a generalized block diagram representation of a receiving portion 301 of an example GPS receiver unit. The antenna 303 receives signals from one or more GPS satellites. The received signals are provided to a demodulator 305, which demodulates the signals using a carrier frequency, for example 1.57542 GHz, as represented by block 307. The resulting data signal 309 corresponds to the signal 215 of the satellite. The spread spectrum signal 309 is then despread in the correlator 311 using PN code 313. The data decoder 315 can then decode the data needed which will be used to triangulate the position of the receiving unit.

FIG. 4 shows a tabular representation of a spectrum spreading and despreading, or correlating process illustrated with a spreading code of length 8. Three 8 bit spreading codes are illustrated. Spreading code 1, 401, is 11000011, Spreading code 2, 403, is 00110011, Spreading code 3, 405, is 10010110. To spread data using a spreading code 1 for example, if a data "1" is to be sent, a copy of the code as in column 407, 11000011, is sent in its place. If a data "0" is to be sent, the inverse code, with each bit inverted, as shown in column 409, 00111100 is sent in its place. In other words if spreading code 1 is used and data representing a "1" is to be sent then the code 11000011 is sent, similarly if data representing a "0" is to be sent then the code 00111100 is sent.

The despreading process involves a mathematical manipulation, i.e. correlation with the received data. For example suppose that data is to be received from a sender who is using spreading code 1n. To despread the data, first all the "0"s of the received code are replaced by −1 for computational purposes. If 11000011 (code 1's representation of a "1") is received, it is replaced by 11−1−1−1−111 as shown in line 411. The received code is then multiplied bit by bit by the computational representation of the spreading code, i.e. 11−1−1−1−111 as shown in line 413. The bit-wise;product of the spreading code and the data received is shown in line 415 as 1+1+1+1+1+1+1+=+8, the product of the correlation is +8 and thus a binary "1" is detected. If 00111100 (code 1's representation of a "0" as shown in column 409) is received it's replaced by −1−11111−1−1 as shown in line 417. The received code is then multiplied bit by bit by the computational representation of the spreading code, i.e. 11−1−1−1−111, as shown in line 419. The bitwise product as shown in line 421 is −1−1−1−1−1−1−1=−8, the product of the correlation is 8 and a binary "0" is detected. If the signal had been correlated with the inverse of the spreading code, the product would have been a +8. The methods are equivalent and the selection can be made based on the particular implementation used.

A situation where the data transmitted by a signal spread with code 1 is despreaded by spreading code 2 is illustrated in lines 423, 425, and 427. As an example a spreading code 1 data bit of "1", i.e. 11000011, is received. As shown in line 423 the 0 bits are replaced by −1 for computational purposes. Then the received code 11−1−1−1−111 is multiplied bit by bit with the spreading code 2, e.g. −1−111−1−111 as shown in line 425. The product of multiplying a spreading code 1 data "1" with spreading code 2 is shown in line 427 as −1−1−1−1+1+1+1+1=0. That is, when a spreading code 1 representation of a data "1" is multiplied bit by bit and summed with spreading code 2, i.e. data spread with code 1 is correlated with code 3, the result is 0, in other words no data is detected. Therefore a transmission of a binary 1 using spreading code #1 will not interfere with data interpretation using spreading code 2.

A situation where the data transmitted by a signal spread with code 1 and despread using spreading code 3 is illustrated in lines 429, 431, and 433. As an example, a spreading code 1 data bit of "1", i.e. 11000011, is received. As shown in line 423 the 0 bits are replaced by −1 for computational purposes. Then the received code 11−1−1−1−111 is multiplied bit by bit with the spreading code 3, e.g. 1−1−11−111−1 as shown in line 431. The product of multiplying a spreading code 1 data "1" is shown inline 427 as 1−1+1−1+1−1+1−1=0. That is, when a spreading code 1 representation of a data "1" is multiplied bit by bit and summed with spreading code 3, the result is 0, in such case no data is detected. Therefore, the transmission of a binary 1 using spreading code 1 will not interfere with data interpretation using spreading code 3.

The above examples illustrate the fact that data transmitted with one code does not interfere with data transmitted with another code. This property whereby transmission of data by one code does not mask the data transmitted by another code is commonly referred to orthogonality, and codes having such properties are said to be orthogonal.

The previous illustrations were performed with a class of codes known as Walsh codes, which are perfectly orthogonal. The number of Walsh codes, however, is limited. The number of Walsh codes that exist is equal to the number of bits in the spreading code. Because this situation is restrictive, a family of codes known as pseudo noise (PN) codes, which are nearly orthogonal, have been developed. PN codes are codes that repeat periodically and have the property that if they are multiplied by themselves and the bits summed the result is a number that is the same as the length of the sequence. That is, under ideal conditions the correlation product of a PN code of length N with a signal containing that code will be the value N. For example the GPS PN code length is 1023, so that if we correlate the GPS signal with a code which is contained in the signal the output of the correlator will be 1023, if the signal is not present then the value will be −1.

PN codes also have the property that, if they are correlated with the signal containing that particular PN code which is.shifted in time by any number of bits, then the result is a −1. This means that the correlation must be synchronized in time with the spread spectrum signal bearing the code in order to produce an output equal to the length of the code. There are literally millions of PN codes, and so they are appropriate for use within portable phoneosystems.

An advantage of a spread spectrum system is its greater noise toleration and low power signal all as for decoding in harsh environments. Since signals in a spread spectrum system can be very low, this can lead to difficulty in acquiring a signal, and identifying that the signal is present. A process known as hypothesis testing can be used in order to facilitate the acquisition process. The process compares successively higher values to the output .of the correlator to determine if a signal is present. This process aids acquisition in two ways. First, if there is an erroneously high correlation value (i.e. potential multipath signals), it is not instantly identified as a correctly decoded signal, because it must pass several successive thresholds. Second, if there is a large amount of transient interference resulting in a low correlation number, the signal is not instantly rejected as incorrect. As a result of the hypothesis testing process, the signal must be examined over several sample sets to determine if it has been correctly acquired (i.e. the correct PN code selected and correctly aligned with the incoming received signal sequence.

Figure 5:
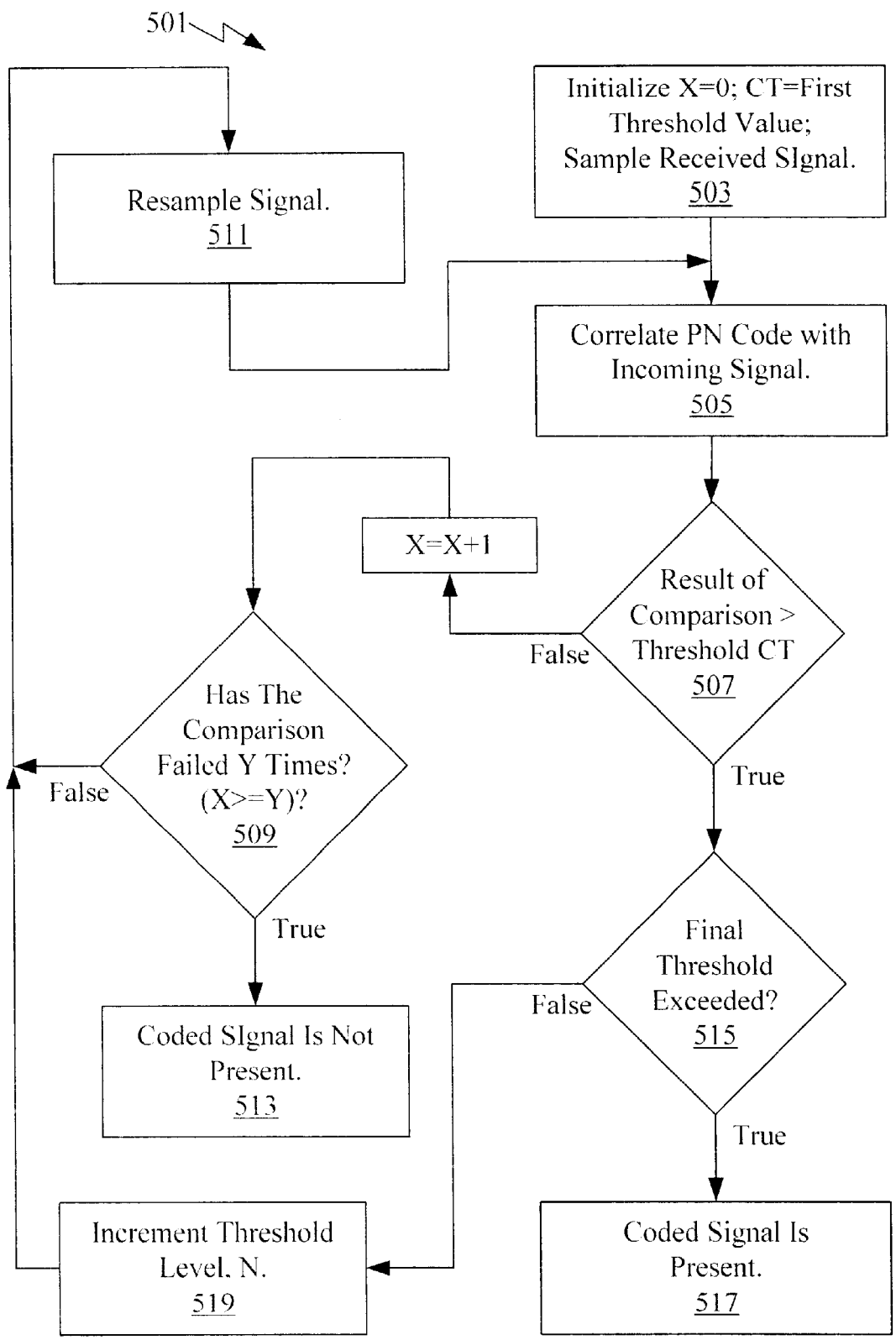
FIG. 5 is a flow diagram illustrating a generalized example of a hypothesis testing procedure.

FIG. 5 is a flow diagram illustrating a general example of a hypothesis testing procedure. In the first block of the procedure the parameters are initialized. The current threshold level, CT that is being tested is initialized to the first threshold level, i.e. 1 so that the lowest level is compared first. A counter, X, which keeps track of how many times the correlated value of the signal has failed to exceed a hypothesis testing threshold, is initialized to 0. Also, in the initialization block, the incoming signal is sampled for the first time. After initialization in block 503, control passes on to block 505. In block 505, the received signal is correlated with a PN code using bit by bit multiplication. Control then passes on to decision block 507. In decision block 507 the result of the correlation of the signal to the PN code is compared to the current threshold level, CT. If the correlation has not resulted in a number greater than the current threshold value, then X is incremented and control passes to decision block 509. If the correlation has resulted in a number whose value is greater than the current threshold CT, then control passes to decision block 515. In decision block 515 a determination of whether CT is the maximum threshold level is made. If the current value of CT is the maximum threshold value, then all intended thresholds have been met and the correct PN code must have been used and properly aligned with the incoming signal. Control then passes to block 517, where the algorithm terminates with the acquisition of the signal and the determination that the particular PN code is present. If decision block 515 finds that the final threshold level has not been passed, control passes to block 519 where CT, representing the threshold level that is being examined, is incremented to the next level. From block 519 control passes to block 511, in which the signal is resampled. After the signal has been resampled, control passes to block 505 and the process continues.

If the correlated value in block 507 is not greater than the nth threshold value, then X is incremented in block 508 and control passes to decision block 509. In block 509, a determination as to whether the comparison as indicated by X has failed Y times is made, where Y is a number determined by the particular implementation of the procedure. If the comparison has failed Y times, then control passes to block 513, indicating that the signal has not been acquired using the present PN code and the procedure terminates. If decision block 509 finds that the comparison has not failed Y times, then there is still a possibility that a correct PN code has been found to acquire the incoming signal and control passes to block 511, which resamples the signal. Control then passes to block 505 and the procedure continues.

Figure 6:
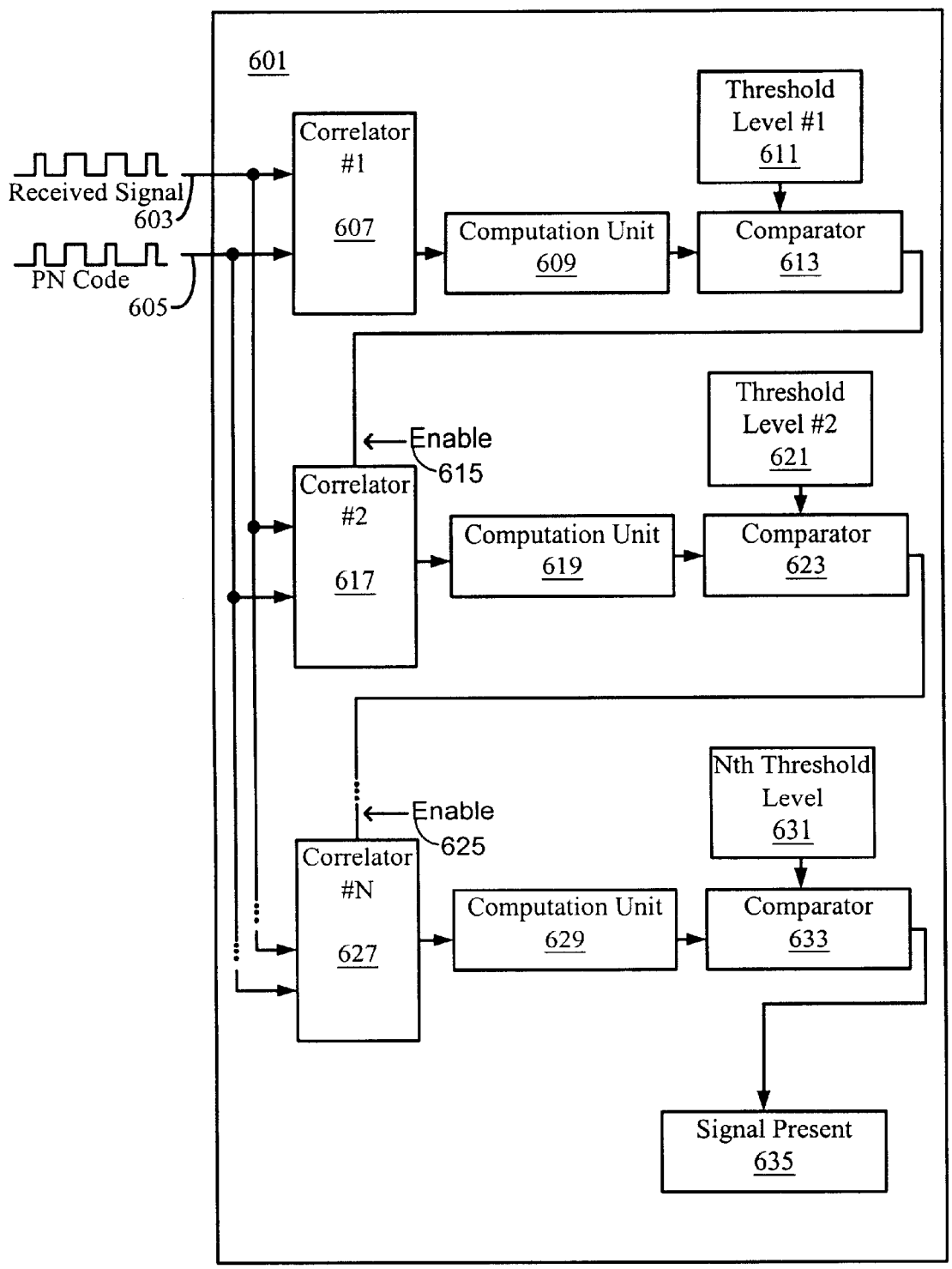
FIG. 6 is an block diagram illustrating an example of a modified hypothesis testing procedure as it may be found in a GPS receiver or within a portable CDMA phone.

FIG. 6 shows an example implementation of hypothesis testing in a GPS receiver or a portable CDMA phone. In this example hypothesis tester 601, a received signal 603 containing spread spectrum information is compared to a PN code 605 in a correlator 607. The output is then sent to a computation unit 609 where the decoding data may be averaged, or large deviations discarded, or other mathematical operations such as counting the number of correlations attempted may be performed. The computation unit may also pass the data on to the next stage, the comparator 613, unaltered depending on the particular application. The comparator then compares the value received from the computational unit to a first threshold level 611. If the unit matches or exceeds the first threshold level it will enable a comparison by second correlator, 617, by sending it an enable signal 615. The second comparison will not be performed unless the first level comparison is successful. Correlator 617 is also connected to the received signal 603, containing spread spectrum information, and the same PN code 605 used in the first correlator. The output of the second correlator 617 is coupled to a second computation unit 619 with similar potential functionality to that of computation unit 609. When the second computational unit 619 has completed its operations on the output of second correlator 617 the result is coupled to the comparison unit 623, where it is compared with a second threshold level 621. If the comparison is such that the results match or exceed threshold level number 2, then second comparator 623 couples an enable signal 625 to the next level, thereby activating the next level. This process continues evaluating the incoming signal against a PN code through N thresholds.

The Nth correlator 627 is also connected to the received signal 603 containing spread spectrum information and the PN code 605 to which it is to be compared, as were the previous stages. The output of the Nth correlator 627 is coupled to the Nth computational unit 629. When the Nth computational unit 629 has completed its operations on the decoding performed in the correlator 627 the result is coupled to the comparator unit 633, where it is compared with the final Nth threshold level 631. If the comparison is such that the results match or exceed threshold level N then comparator N 633 will output a flag 635 that indicates that PN code 635 has been found to decode one of the messages present in the received signal 603.

The hypothesis testing unit illustrated in FIG. 6 is an example implementation. There are a variety of possible alterations which may be implemented depending on a variety of factors such as the amount of hardware available, the computing resources available, the specifications for signal acquisition time which must be met, and other details which may vary from implementation to implementation. For example, there may not be multiple decoding units (i.e. 607, 617, 627), computational units (i.e. 609, 619, 629), or comparison (i.e. 613, 623, 633) units available, and thus the same functional units may be used repetitively for each stage of the hypothesis testing. The decoding, computational, and comparison units may be omitted and their functions implemented using a microcomputer and appropriate software.

The individual blocks themselves may also exhibit a great variety of variation. For example, each correlator may actually contain more than one correlation unit. Some implementations may use multiple comparison units to compare the signal received to the PN code because of difficulties in synchronizing the two signals precisely. Such a variation is illustrated in FIG. 7.

Figure 7:
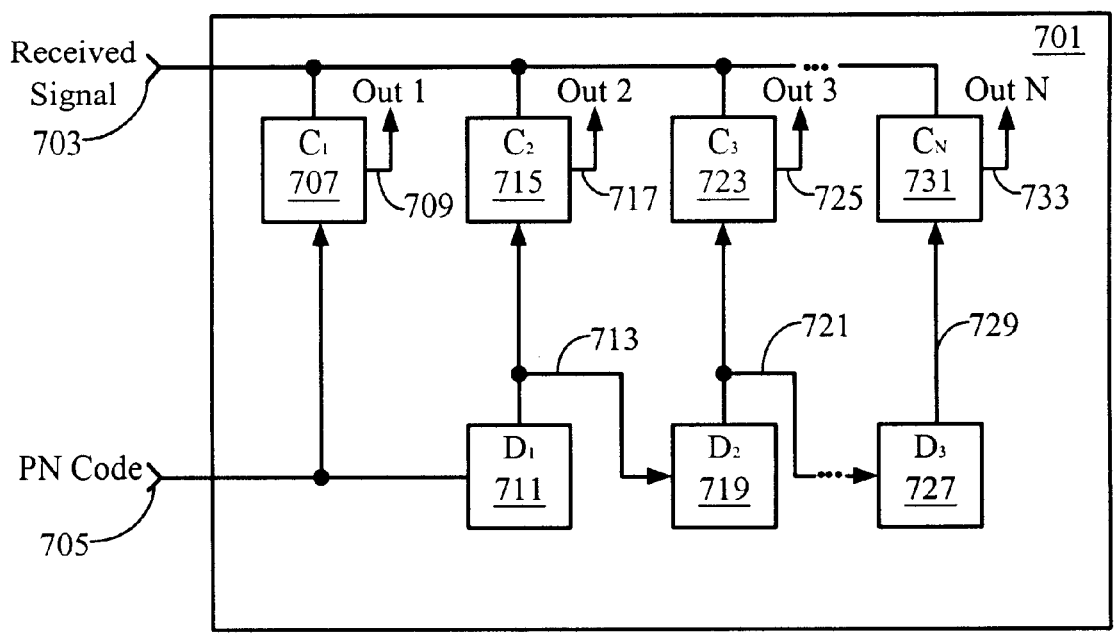
FIG. 7 is a block diagram of an alternate implementation of the correlator in FIG. 6.

FIG. 7 is a block diagram of a multiple comparator 701. The received signal 703 and the PN code 705 are coupled into the multiple comparator 701 and are compared in a first stage C1, 707, An output 709 is generated as the result of the comparison. The PN code is also delayed in delay block D1, 711 and a delayed version is 713 is coupled to comparator C2 715, which compares the delayed PN code to the received signal 703, and produces an output 717. The delayed PN code 713 is then put through a further delay D2 in block 719 and the further delayed PN code 721 is coupled to comparator C3 723, which then compares the delayed PN code to the received signal 703. This process can proceed through a number of stages, e.g. M, which successively delay the PN code. In the last stage the delayed PN code 729 will have M delays 727 inserted and will be compared with the received signal 703 in the M+1 correlator 731 and will produce the M+1 output 733. The output which has the highest value is the stage which has achieved the best synchronization between the PN code and the received signal.

In addition the mechanism of FIG. 7 can be used to determine interference levels. If the output of all the stages are high, then there is strong interference and a strong signal is present.

As one skilled in the art will recognize, there are a variety of different variations of the multiple comparator scheme which may be used. The number of delays may be increased or decreased, the time of each delay may change, the PN code may be advanced as well as delayed, the received signal may also be delayed, and other variations are possible.

Systems containing CDMA or spread spectrum components may employ various methods of hypothesis testing for signal acquisition and PN code identification. Hypothesis testing can prevent correct PN codes from being rejected based on a transiently interfering signal, and can prevent an incorrect PN code, from being accepted because of a transient interference. Hypothesis testing can also allow marginal signals to be decoded due to the successive attempt nature of the method.

The method has drawbacks however. For example if a signal is low, because of overhead foliage for instance, identifying the proper code and acquiring the signal can take a significant amount of time because of the successive threshold tests which must be passed which can also take a significant amount of time.

Hypothesis testing can also degrade performance under strong signal conditions. If a signal is strong and the direct path between the signal source and the receiving unit is blocked, the receiving unit may acquire a reflection of the signal. Such a reflected signal is commonly referred to as a multipath signal, because, in addition to the direct path of the signal to the receiver, there is another indirect path from the transmitter to the receiver. In a phone unit that contains a comparator such as that in FIG. 7, this can lead to an incorrect delay being identified as corresponding to the proper timing between the received signal and the PN code, if a correlator synchronizing schemes, such as illustrated in FIG. 7, is employed . In such a case, the improper timing can continue when multipath signal fades and the resulting phone connection may be degraded. Multipath signals are so common a problem that in some systems, for example the IS-95 standard, the multipath signals are decoded to enhance the performance of the receiver.

In an application, such as a GPS receiver, locking on to a multipath signal, may cause the GPS unit to exhibit an incorrect position due to the additional time a multipath signal takes to travel from the source satellite to the receiver. The unit may interpret this additional time as additional distance from the signal source.

The threshold levels within the hypothesis testing determine how much of a problem each of these phenomena are. If the threshold levels are higher in the hypothesis testing, then the difficulty with multipath signals tends to be minimized because multipath signals tend to be weaker than directly propagated signals and, thus, higher hypothesis testing threshold levels will tend to reject the weaker multipath signals. Conversely, under weak signal conditions, the lowering of hypothesis testing threshold levels will tend to speed the acquisition of the signal and the determination of the correct PN code because the correlator outputs, on average, will be less with weak signals.

Hypothesis testing threshold levels reflect a particular compromise between these two extremes to be effective. In one aspect of the invention, different embodiments compensate for these two opposing requirements by adjusting the threshold values within the hypothesis testing mechanism. It should be noted that the phrase "adjusting threshold values" can have more meaning than merely adjusting the actual level of the threshold values. As one skilled in the art will appreciate, the phrase "adjusting threshold values", in addition to meaning adjustment of the actual level of the threshold values, it can also mean: eliminating a series of threshold values, adding a series of threshold values to the values being used, changing the number of times a signal must be found to exceed the threshold in order to pass on to the next threshold, changing the magnitude between threshold values, or other methods which alter the characteristics of the hypothesis testing. Several embodiments of the invention will be described in order to illustrate a variety of possible implementations. These examples are for illustrative purposes only, and many other variations of the invention may be implemented without departing from the spirit of the invention or the inventive concept embodied therein.

Figure 8:
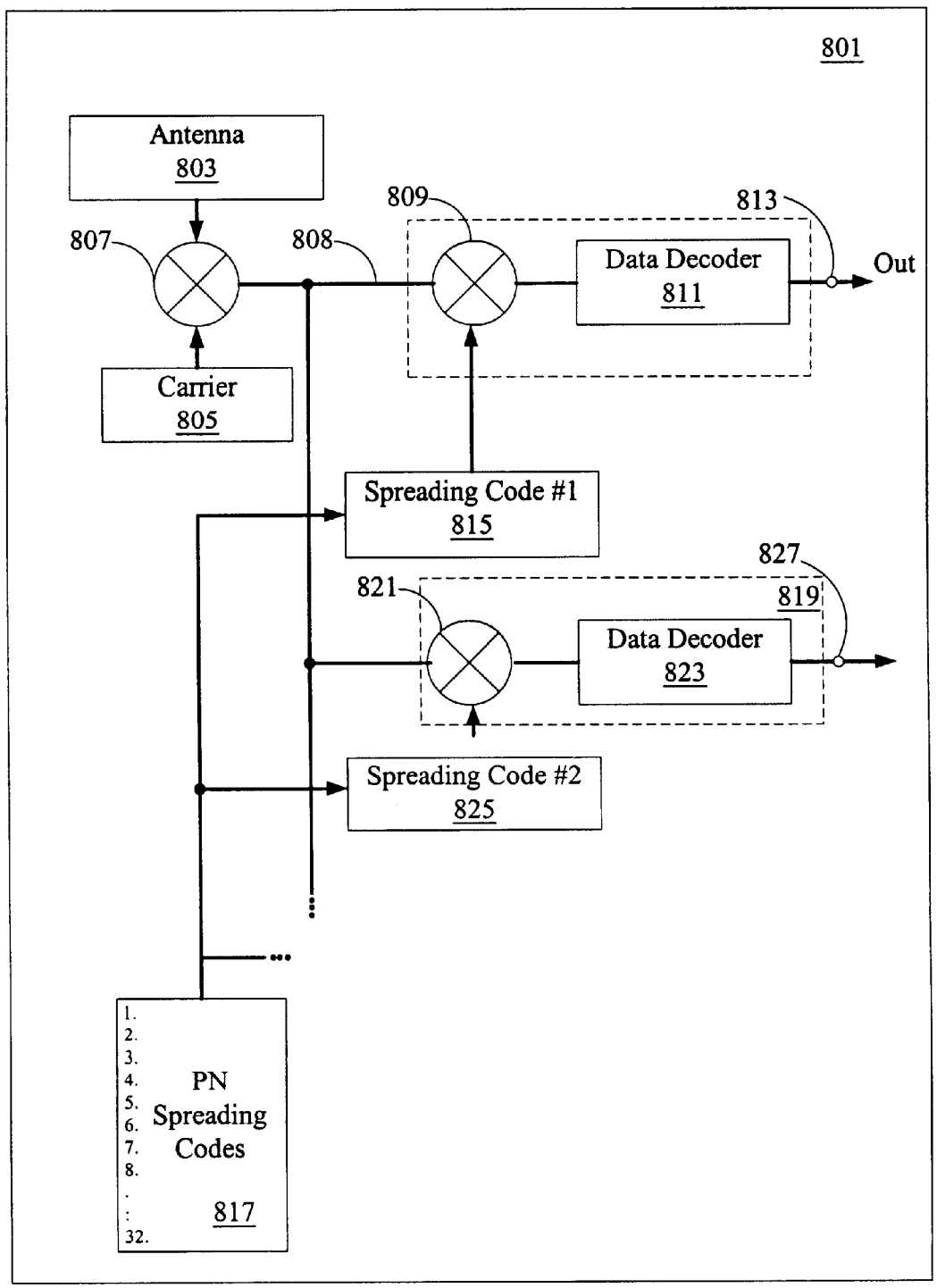
FIG. 8 is a block diagram of detailed representation of an embodiment of an example GPS receiver according to an embodiment of the invention.

FIG. 8 is a block diagram of detailed representation of a preferred embodiment of an example GPS receiver system 801, for decoding of signals from multiple satellites. The GPS receiver receives the satellite signals through an antenna 803. A demodulator 807 mixes the signal with a carrier frequency 805 and the resultant signal 808 is reduced to base band frequencies. The resultant signal 808 is a composite of all the satellite signals that the GPS receiver unit receives. To decode an individual satellites data stream the composite signal 808 must be correlated with the correct PN code. If the composite signal is correlated with an incorrect code, no data will be decoded. There are 32 PN codes that are designated by the GPS authority for use within the GPS system. Twenty four of these PN codes will be used by active satellites for the purpose of encoding their data. Each of the 24 active satellites in the GPS system has its own individual PN code.

A GPS receiver must extract data from several satellites in order to determine the position of the receiver, and it must extract data from the satellites simultaneously. This situation is represented in the example embodiment shown in FIG. 8. In the embodiment shown the GPS receiver unit represented can extract data from 12 satellites simultaneously. Codes are obtained from the code table 817 which contains all 32 GPS PN spreading codes, sometimes these codes are referred to as GPS' "Gold" codes. "Gold Codes" are obtained by adding two PN sequences with different phase shifts. PN coded #1, 815, which has been obtained from the code table 817 is used in the correlator 809 to extract the data from the signal. The resulting data is then decoded in the data decoder 811. The output 813 of the data decoder 811 contains information from the satellite, which can then be used to ascertain the distance of the satellite from the receiver.

A second correlating and data decoding unit 819 is illustrated similar to the first. The second unit takes a second PN code 825 and multiplies it with the incoming signal in the correlator 821 to despread it. The data thus despread is decoded in the data decoder 823, the output of which 827 is used to ascertain the distance of the satellite from the receiver.

There are 12 such units in the present example embodiment. At least four satellite signals are necessary to be certain that a location point can be triangulated and the position of the receiver determined. Having more than four signals can increase the accuracy of the position fix. A GPS receiver on earth can receive signals from at most 11 satellites at one time. This leaves one spare correlating and data decoding unit. In one embodiment of the invention this spare despreading and data decoding unit will be used with the 25th satellite code, which is guaranteed by the GPS authority never to be in any satellite.

The embodiment of the invention which uses the 25th satellite code correlates it with the incoming spread spectrum signal. Because there is guaranteed to be no signal using the 25th code, and because this embodiment has at least one spare correlator unit the 25th code can be continually correlated with the spread spectrum signal being received. The output of this correlation should ideally be a constant −1. In the real world, however this output will many times differ from −1. This difference is caused by interference and noise present in the signal. With no code modulation present the output of this correlator will then be a function of the signal strength, and the output of this correlator can then be used to determine the signal strength. Knowing the signal strength, the threshold values of the hypothesis testing portion of the circuit can then be modified to give better results. In high signal conditions, the values of the thresholds within the hypothesis tester can be increased in order to reduce the likeliness that a multipath signal may be acquired. Modified hypothesis testing can reduce the acquisition time in the reduced signal environment by reducing the hypothesis testing thresholds.

Portable phones do not have a code similar to the 25th GPS code which is dedicated to being unused in any unit. There is no such guaranteed unused code which can be used for the purpose of determining the signal strength. A PN code however could be so designated. In lieu of a dedicated unused code, phones can use a code that is currently not in use. They can be programmed with several codes. The phones correlator can then search for signals using these codes. If two codes which have no detectable signal present show the 'same non −1 correlated output, then it can be assumed that those codes are not being used and the values out of the correlators can be used to determine the signal strength. This embodiment is illustrated in FIG. 9.

Figure 9:
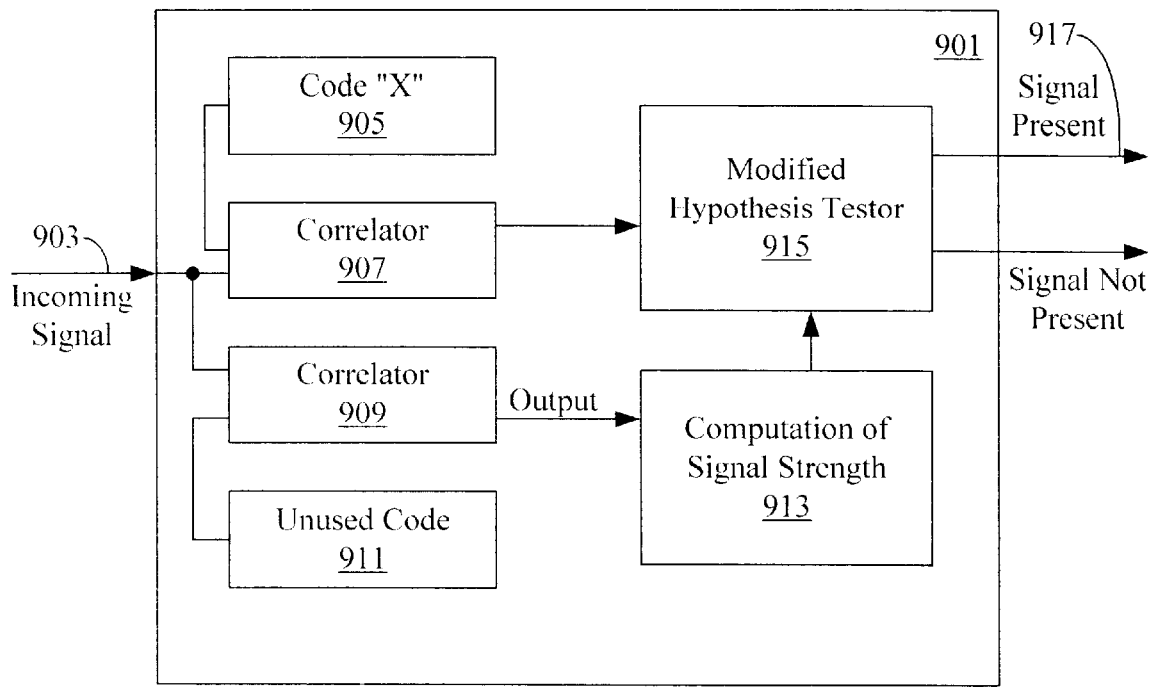
FIG. 9 is a block diagram of an example embodiment of modified hypothesis testing incorporated into a spread spectrum receiver system.

FIG. 9 is a block diagram of an example embodiment of modified hypothesis testing incorporated into a spread spectrum receiver system. A preferred embodiment of a signal acquisition unit 901 which be incorporated into a portable CDMA phone, CDMA phone base station, or a GPS receiver. It might alternatively be incorporated in its present or a changed form into other systems which use spread spectrum technology.

The function of the signal acquisition unit in this embodiment is to determine whether a signal with a particular code is present. The spread spectrum signal 903 is coupled to both correlator 909 and correlator 907. Correlator 909 is used to correlate the signal with a code 911 that is not being used to encode a signal, i.e. an unused code. The output of this correlation step is then coupled to the computational unit 913 which computes a value for signal strength and then further uses this computed value of signal strength to modify the threshold values in the modified hypothesis tester 915.

The incoming spread spectrum signal 903 is also coupled to the correlator 907. Code X, which is the PN code 905, that the unit is attempting to acquire, is coupled to the correlator 907. The output of the correlator 907 is coupled to the modified hypothesis tester 915, which will provide a signal 917, if it finds that the signal containing code X is present, and will provide signal 919, if signal containing code X is not present. The modified hypothesis testing can identify whether a signal using code X as a spreading code is present (acquire the signal) and can also decide that a signal is not present faster than a non modified hypothesis testing system. This can be especially useful in spread spectrum cordless phones of the type that are used within homes. Those phones must search for an empty code to use every time a call is made or answered, and it is important that the search time for a code be as brief as possible.

Some GPS receivers employ active antennas to boost the reception of the GPS signals. One of the advantages of embodiments of the present invention, is that their increased sensitivity may allow the use of much less expensive passive type antennae. This increase in signal acquisition sensitivity opens the possibility of reduced cost units with passive antennae. The increase in signal acquisition sensitivity also enables embodiments in which an active antenna is switched in and out of the circuit. This type of implementation may be used to increase the sensitivity by employing modified hypothesis testing in the case where an active antenna is still used. A preferred embodiment where an active antenna is switched in and out of the circuit is illustrated in FIG. 10.

Figure 10:
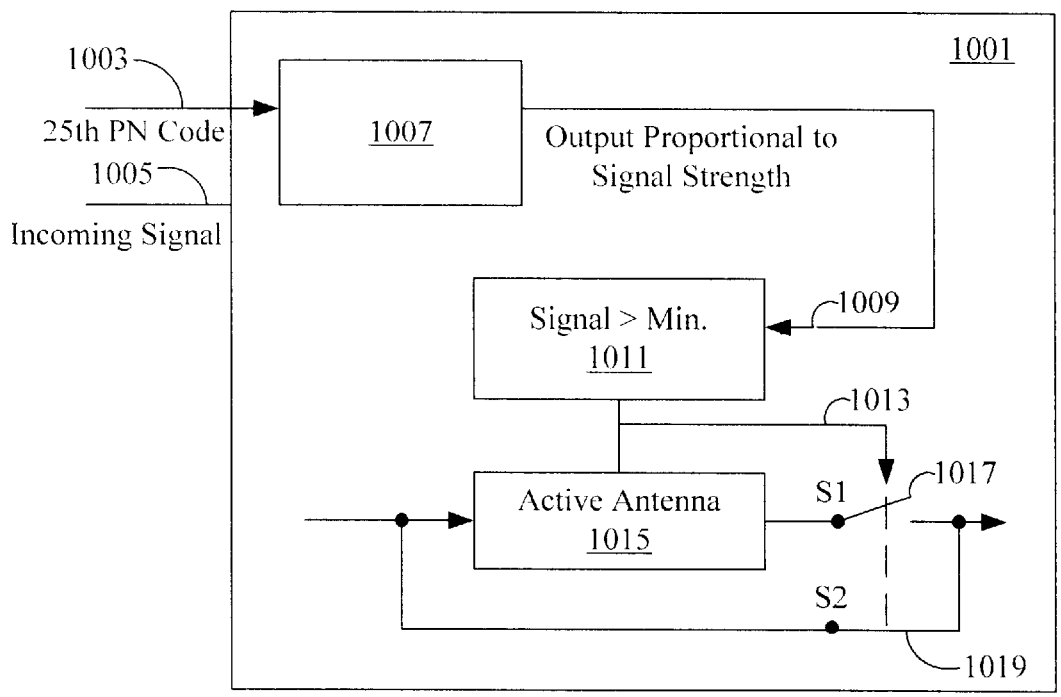
FIG. 10 is a block diagram example embodiment of a signal strength determination in a GPS receiver being used to switch an active antenna.

FIG. 10 depicts an antenna switching scheme in a GPS receiver according to an example embodiment. The 25th satellite PN code 1003, which is not present in any satellite, is combined with an incoming signal 1005 in a correlator 1007. The output of the correlator 1007 is proportional to the signal strength of the incoming signal. The output 1009 is coupled to a comparator 1011. The result of the comparison 1013, is then provided to switches 1017 and 1019 in such a fashion that, when the signal is low, the active antenna 1015 is switched into the circuit, and when the signal strength is high, the antenna is switched out of the circuit. This type of arrangement has several benefits. One benefit of the switched antenna arrangement is that modified hypothesis testing decreases the time necessary to determine whether the signal is present or not. It also enables weaker signals to be acquired than could be acquired without the system. The signal strength determination and antenna switching not only speeds the acquisition of weak signals and enables the acquisition of signals that could not otherwise be acquired, in addition the switching out of the active antenna in high signal conditions combined with the modified hypothesis testing will minimize the problem of multipath signals being acquired.

The above specification and examples provide a complete description of the, invention which will enable one skilled in the art to practice it. It also provides the best known mode of practicing the invention. One skilled in the art will recognize that the ideas embodied in this invention may be combined and modified in a multitude of ways. Since many embodiments of the invention can be made without departing from the spirit and scope of the invention, the invention resides in the claims hereinafter appended.

We claim:

1. A method for improving reception of spread spectrum communications, the method comprising:

receiving a spread spectrum signal;

determining the strength of the spread spectrum signal;

correlating the spread spectrum signal with a particular PN code to produce a correlated output;

adjusting a threshold value based on the signal strength of the spread spectrum signal to a first predetermined threshold level;

comparing the correlated output to the threshold value to determine whether the particular PN code is present in the spread spectrum signal;

adjusting the threshold value of the spread spectrum signal to a next predetermined threshold level if a final threshold level is not equal to the next predetermined threshold level; and switching between active and passive antenna operation mode depending on the signal strength.

2. The method of claim 1 wherein the comparison is performed by using a hypothesis testing mechanism.

3. The method of claim 1 wherein the signal strength is determined by:

correlating the spread spectrum signal with a PN code guaranteed not to present; and using the correlation value determined by correlating the spread spectrum signal with the PN code guaranteed not to be present in the system to determine the signal strength.

4. The method of claim 1 wherein the signal strength is determined by:

correlating the spread spectrum signal with a PN code not being received by the system; and using the correlation value determined by correlating the spread spectrum signal with a correlation code not being received in the system to determine the signal strength.

5. An apparatus for improving a spread spectrum communications system comprising:
  a spread spectrum signal receiver;
  means for determining the signal strength of a spread spectrum signal received by the receiver;
  a first correlator for correlating the spread spectrum signal with a PN code;
  a comparison unit for comparing an output of the first correlator to a first threshold level for the purpose of deciding if a particular PN code is present in the spread spectrum signal;
  means for adjusting the first predetermined threshold level to a second predetermined threshold value based on the signal strength of the spread spectrum signal; and
  switching between active and passive antenna operation depending on the signal strength.

6. An apparatus as in claim 5 wherein the comparison unit further comprises a mechanism for performing mathematical operations on the values output from the first correlator.

7. An apparatus as in claim 5 wherein the means for determining signal strength further comprises:
  a PN code not currently being received by the receiver;
  a comparator for comparing the output of the second correlator to the second predetermined threshold value.

8. An apparatus as in claim 5 wherein the comparator contains a hypothesis testing mechanism.

9. An apparatus as in claim 5 wherein the means for determining signal strength further comprises:
  a plurality of PN codes within the spread spectrum signal received by the receiver;
  a correlator for correlating the plurality of PN codes with the spread spectrum signal;
  a device for retaining the correlated values; and
  a comparison circuit for comparing the correlated values with a predetermined maximum value.

10. An apparatus as in claim 7 wherein the code not currently being received is the 25th GPS code.

11. A method for improving reception of spread spectrum communications, the method comprising:
  (a) sampling a spread spectrum signal spread by a first PN code;
  (b) selecting an initial predetermined value for a current threshold value;
  (c) correlating the spread spectrum signal with a selected PN code to produce a correlated output:
  (d) determining the signal strength of the spread spectrum signal;
  (e) switching between an active and passive antenna mode depending upon the signal strength;
  (f) comparing the correlated output to the current threshold value;
  (g) upon the correlated output exceeding the current threshold value and the current threshold value exceeding a desired predetermined final threshold value, indicating the selected PN code is present in the spread spectrum signal;
  (h) upon the correlated output exceeding the current threshold value and the current threshold value is below the desired final predetermined threshold value adjusting the current threshold value to a next predetermined threshold level;
  (i) when the correlated output is below the current threshold value; incrementing a failure counter and determining whether the failure counter exceeds a desired failure total;
  (j) when the correlated output is below the current threshold value and the failure counter exceeds the desired failure total, indicating the selected PN code is not present in the spread spectrum signal;
  (k) repeating (a) through (j) until there is an indication that the spread spectrum signal is either present or not present.

12. The method according to claim 11 wherein the initial value of the current threshold value is based on signal strength of the spread spectrum signal, the method further comprising determining the signal strength of the spread spectrum signal.

13. The method according to claim 12 wherein adjusting the current threshold value is dependent upon the signal strength of the spread spectrum signal.

14. An apparatus for improving reception of a spread spectrum signal comprising:
  a spread spectrum signal receiver;
  means for sampling a spread spectrum signal received by the receiver;
  means for selecting an initial predetermined value for a current threshold value;
  a correlator operably receiving a sampled spread spectrum signal and a selected PN code;
  means for determining the signal strength of the spread spectrum signal;
  means for switching between an active and passive antenna mode depending upon the signal strength;
  a comparator operably receiving an output of the correlator and comparing the output of the correlator to the current threshold value;
  means for determining reception of the spread spectrum signal, the reception determining means; (i) adjusting the current threshold value upon (a) the correlated output the current threshold value and (b) the current threshold value is less than a desired final predetermined threshold value (ii) indicating the presence of the selected PN code in the spread spectrum signal upon (a) the correlated output exceeding the current threshold value and (b) the current threshold value exceeding the desired final predetermined threshold value, and (iii) incrementing a failure counter when the correlated output is below the current threshold value; and
  means for indicating failure to detect the selected PN ode n the spread spectrum signal upon the failure counter exceeding a desired failure rate.

15. An apparatus as in claim 14 wherein the means for selecting an initial value for a current threshold value includes means for determining the signal strength of the spread spectrum signal.

16. An apparatus as in claim 14 further comprising a plurality of additional correlators each working in substantially parallel with the correlator to correlate the spread spectrum signal with time shifted copies of the selected PN code to facilitate quicker acquisition.

* * * * *